US012741776B2

(12) United States Patent
Wang

(10) Patent No.: US 12,741,776 B2

(45) Date of Patent: Sep. 22, 2026

(54) STICKER OUTPUT BOX, STICKER DISPENSING DEVICE, AND ATTENTION TRAINING METHOD FOR CHILDREN

(71) Applicant: Shenzhen Xiaoguan Technology Co., Ltd., Shenzhen (CN)

(72) Inventor: Tianlong Wang, Shenzhen (CN)

(73) Assignee: Shenzhen Xiaoguan Technology Co., Ltd., Shenzhen (CN)

(*) Notice: Subject to any disclaimer, the term of this patent is extended or adjusted under 35 U.S.C. 154(b) by 136 days.

(21) Appl. No.: 18/629,601

(22) Filed: Apr. 8, 2024

(65) Prior Publication Data

US 2024/0351729 A1 Oct. 24, 2024

(30) Foreign Application Priority Data

Apr. 24, 2023 (CN) ......................... 202310470364.5
Apr. 24, 2023 (CN) ......................... 202320947242.6
Apr. 24, 2023 (CN) ......................... 202320947245.X
Apr. 24, 2023 (CN) ......................... 202320947247.9
Apr. 24, 2023 (CN) ......................... 202320947249.8
Apr. 24, 2023 (CN) ......................... 202320947254.9

(51) Int. Cl.
*B65C 9/18* (2006.01)
*B65C 9/40* (2006.01)

(52) U.S. Cl.
CPC .................. *B65C 9/18* (2013.01); *B65C 9/40* (2013.01); *B65C 2210/0078* (2013.01)

(58) Field of Classification Search
CPC ........... B65C 9/18; B65C 9/0006; B65C 9/40; B65C 2201/00; B65C 2210/0078; B65C 2210/00; B65H 16/005; B65H 2701/194
See application file for complete search history.

(56) References Cited

U.S. PATENT DOCUMENTS 4,451,323 A * 5/1984 Sato ...................... B65C 11/004
156/577
4,511,073 A * 4/1985 Furutsu .................. B65C 7/005
227/67
5,049,228 A * 9/1991 Sato ......................... B41J 17/32
400/208
6,109,925 A * 8/2000 Druckman ............... G09B 7/00
434/332
2010/0200166 A1* 8/2010 Watanabe ............ B65C 9/1865
156/384

* cited by examiner

*Primary Examiner* — George R Koch

(57) ABSTRACT

A sticker output box, a sticker dispensing device, and an attention training method for children. The sticker output box is detachably mounted to a box mounting structure of a sticker dispensing device. A sticker is peelably affixed to a liner paper. The sticker output box includes: a box body, including a sticker compartment for positioning the sticker roll; and a winding shaft, configured to be rotatable when in contact with the liner paper to wind the liner paper. The box body further includes a liner conveying path, a sticker output port, and a turning peeling portion; the turning peeling portion is arranged on the liner conveying path and is disposed at the sticker output port, and the turning peeling portion is configured to cause the sticker to be peeled off of the liner paper by conveying the liner paper in a direction different from a travel direction of the sticker.

22 Claims, 9 Drawing Sheets

STICKER OUTPUT BOX, STICKER DISPENSING DEVICE, AND ATTENTION TRAINING METHOD FOR CHILDREN

CROSS REFERENCE

The present disclosure claims priority of Chinese Patent Applications No. 202320947245.X filed on Apr. 24, 2023, No. 202310470364.5 filed on Apr. 24, 2023, No. 202320947242.6 filed on Apr. 24, 2023, No. 202320947247.9 filed on Apr. 24, 2023, No. 202320947249.8 filed on Apr. 24, 2023, and No. 202320947254.9 filed on Apr. 24, 2023, the entire contents of which are hereby incorporated by reference in their entirety.

TECHNICAL FIELD

The present disclosure relates to the technical field of stationery products, and more specifically to a sticker output box, a sticker dispensing device, and an attention training method for children

BACKGROUND

Sticker rolls are stationery products made from coiled strip material. The sticker roll includes a liner and a sticker, and the sticker is peelable and pasted onto the liner; the sticker includes an adhesive side and a printed side, the adhesive side having an adhesive and the printed side being pre-printed with symbols or patterns, etc. The sticker is often printed with various animals or other themes of interest to children, and thus many children enjoy collecting stickers and attaching them to books or textbooks, lunch boxes, and other items. However, in such an arrangement, the stickers tend to become dirty or accidentally adhere to other items.

In order to facilitate dispensing stickers, related art such as a Chinese patent application (Publication No. CN2280699Y) and a U.S. patent (Publication No. U.S. Pat. No. 5,770,008A) discloses a press-type sticker dispenser, which requires manually mounting a sticker roll to a support shaft, mounting a first section of the sticker roll to a corresponding channel, and actuating a friction wheel through a press rack, such that the friction wheel is driven by friction to drive the strip material to move.

Other related art, such as a Chinese patent application (Publication No. CN216003626U), discloses a sticker output box, which requires manually pulling the strip material to move during dispensing of the stickers and similarly, requires a first section of the sticker roll to be mounted to the corresponding channel in advance.

Other related art, such as a Korean patent (Publication No. KR101780438B1) disclosed a package sticker separator, which can realize automatic dispensing of stickers, while it is obviously not suitable for carrying around and similarly, requires a first section of the sticker roll to be mounted to the corresponding channel in advance. Therefore, the existing sticker dispensing devices have at least the technical problem of inconvenient replacement of the sticker roll.

SUMMARY OF THE DISCLOSURE

The technical problem to be solved by the present disclosure is to overcome the above deficiencies of the related art, and to provide a sticker dispensing device, a portable sticker dispensing device, and a sticker output box for dispensing stickers.

In order to achieve the above objectives, the technical solutions adopted in the present disclosure are as follows:

A sticker output box, constructed to be detachably mounted to a box mounting structure of a sticker dispensing device; wherein a sticker is peelably affixed to a liner paper and coiled into a sticker roll, and the sticker output box includes: a box body, including a sticker compartment for positioning the sticker roll; and a winding shaft, configured to be rotatable when in contact with the liner paper to wind the liner paper; wherein the box body further includes a liner conveying path, a sticker output port, and a turning peeling portion; the turning peeling portion is arranged on the liner conveying path and is disposed at the sticker output port, and the turning peeling portion is configured to cause the sticker to be peeled off of the liner paper by conveying the liner paper in a direction different from a travel direction of the sticker.

The above technical solution can be further optimized by the following technical measures.

In some embodiments, the turning peeling portion extends into the sticker output port; or, the turning peeling portion slightly protrudes out of the sticker output port. At least one end portion of the turning peeling portion in a width direction of the liner paper is formed with a loading port, and the liner paper is configured to be loaded into between the turning peeling portion and the sticker output port from the loading port, to facilitate the loading of the liner paper between the turning peel portion and the sticker output port for later replacement of the sticker roll.

In some embodiments, a conveying resistance increasing portion is arranged on a side of the box body at an upstream of the sticker output port on the liner conveying path; the conveying resistance increasing portion is configured to increase a conveying resistance of the liner paper, causing the liner paper to be in a tensioned state when the sticker is being peeled off, such that the sticker is easier to peel from the liner paper when the liner paper is under tension. The conveying resistance increasing portion includes at least one protruding portion; the at least one protruding portion protrudes towards the liner paper to press against the liner paper, for causing an increase in the conveying resistance of the liner paper. The conveying resistance increasing portion is a concave-convex undulating surface formed on an outer wall of the box body. The conveying resistance increase portion increases the conveying resistance of the liner paper by pressing against the liner paper or increasing the friction in contact with the liner paper, and when the conveying resistance is increased, the liner paper can be made to be in a tensioned state. In particular, the tighter the liner paper at the sticker output port is stretched, the easier the sticker is to be peeled off.

In some embodiments, the liner conveying path is upwardly inclined from an upstream of the liner conveying path to the sticker output port, causing the liner paper to be in a tensioned state when the sticker is being peeled off. The turning peeling portion is configured to be inclined toward the upper left side. The liner paper forms a turn angle greater than 90° at the turning peeling portion. The upward inclination of the liner conveying path at the sticker output port and the inclination of the turning peeling portion toward the upper left side, etc. are intended to make the sticker easier to peel, thereby preventing it from adhering to the box body.

In some embodiments, the sticker compartment includes an inner peripheral wall that fits into an inner hole of the sticker roll, and an outer peripheral wall that surrounds an outer periphery of the sticker roll. The sticker compartment can retain the sticker roll within the box body without coming loose.

In some embodiments, the box body includes a base and a lid, the winding shaft being rotatably positioned between the base and the lid, and the lid is arranged with a rotation resistance increasing portion configured to increase a rotation resistance of the winding shaft, for preventing the liner paper wound on the winding shaft from coming loose. The rotation resistance increasing portion is a friction block in frictional contact with a shaft end face of the winding shaft. The friction block may be a flexible friction block made of sponge or rubber, or the friction block is combined with a resilient member. The resilient member is configured to apply force in a direction that causes the friction block to abut against the winding shaft. The rotation resistance increasing portion can increase the rotation resistance of the winding shaft. Especially in a case where the sticker output box is removed without power drive, the provision of the rotation resistance increasing portion can prevent the liner paper wound on the winding shaft from rotating with the winding shaft, such that the liner paper is not loosened and unwound.

In some embodiments, the box mounting structure includes a positioning post with a motor built-in, and the box body is arranged with a positioning groove receiving the positioning post and adapted to the positioning post. The motor being arranged in the positioning post may significantly reduce the size of the main body in the thickness direction and enable the sticker output box to be firmly arranged on the main body.

A sticker dispending device, including a main body and a sticker output box; wherein the sticker output box is separably combined with the main body, and the winding shaft and the motor are connected through a separable coupling structure. The sticker output box can be integrally removed from the sticker dispensing device for replacement, which is convenient for the user.

In some embodiments, the winding shaft is configured to be capable of a forward rotation and a reverse rotation driven by the motor; after the winding shaft is forwardly rotated such that the liner paper is tightened and at least one the sticker is peeled off, the winding shaft is controlled to reversely rotated at a set angle such that the liner paper is slackened to allow the coupling structure to be easily separated.

In some embodiments, the main body is arranged with a locking mechanism, the locking mechanism being capable of locking the sticker output box to the main body; the main body is further arranged with a button, the button being operable to release the sticker output box from a locked state.

In some embodiments, the sticker dispensing device is further capable of mode switching. Two modes are associated with different sticker output boxes, and when the sticker output box is attached to the main body, a toggle switch on the sticker dispensing device can generate a mode switching trigger in response to the sticker box, such that the control unit automatically switches the sticker dispensing device to the working mode corresponding to the sticker box. Different sticker boxes correspond to different working modes, such that children in the training mode will not be able to operate the device to output stickers at will, which plays a role in preventing cheating. In addition, the entertainment mode improves the ease of playability of the product.

An attention training method for children, applied to a sticker dispensing device. When carrying out an attention training for children, it is only necessary to set the training time, and there is no need for the parents to carry out a real-time supervision of the attention training process, which saves the parents' energy. In addition, the rewards can be obtained by the children independently, which improves the interest of the children in the attention training process and the enthusiasm for training.

Due to the adoption of the above technical solution, the present disclosure has the following beneficial effects.

The portable sticker dispensing device is arranged with a driving mechanism to drive the winding shaft in the sticker output box, such that the sticker is automatically peeled off from the liner paper when passing through the turning peeling member, and then output by the sticker output port. The sticker output box is detachably combined with the sticker dispensing device such that it is only necessary to replace the sticker output box directly when the sticker is required to be replaced. The sticker output boxes can be pre-assembled at the factory, which allows the user to quickly change boxes with different types of rolls and eliminates the need to manually install a first section of the roll into the appropriate channel, thereby providing greater convenience to the user. The sticker roll can be mounted in the sticker output box by the user, and the user can replace the sticker roll in the sticker output box to reduce the cost of using the sticker output box compared to directly discarding the sticker output box.

BRIEF DESCRIPTION OF THE DRAWINGS

To more clearly illustrate the technical solutions of the embodiments of the present disclosure, the accompanying drawings of the embodiments will be briefly described below, and it will be apparent that the accompanying drawings in the following description relate only to some embodiments of the present disclosure and are not a limitation of the present disclosure.

Reference numerals

Figure 1:
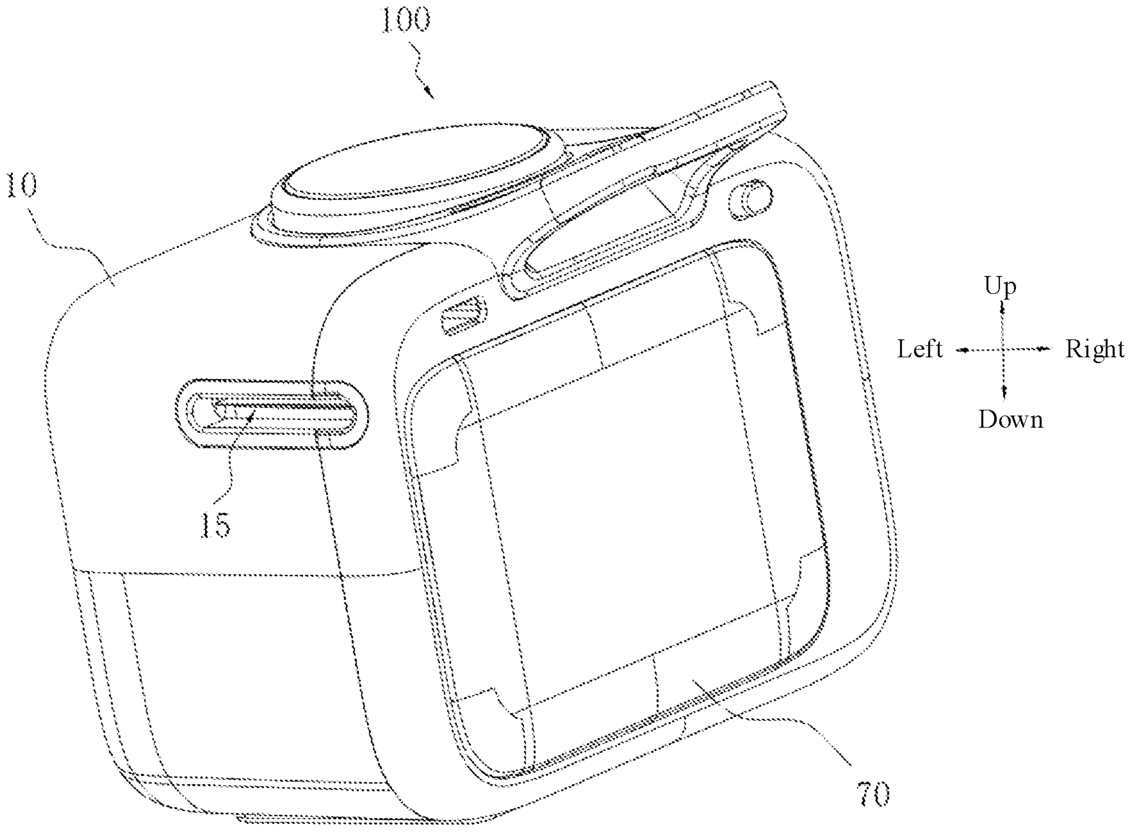
FIG. 1 is a perspective structural schematic view of a sticker dispensing device according to some embodiments of the present disclosure.

| No. | Name | No. | Name | No. | Name |
|---|---|---|---|---|---|
| 100 | sticker dispending device | 40 | movable snap | 76 | receiving channel |
| 10 | main body | 41 | connecting arm | 77 | locking hole |
| 11 | front cover | 42 | hook | 78 | reinforcing rib |
| 13 | mounting cavity | 43 | push rod | 79 | reinforcing rib plate |
| 14 | operation portion | 44 | guide rail | 86 | turning peeling portion |
| 15 | paper outlet | 44 | second positioning post | 86a | inclined surface |
| 16 | switch hole | 45 | button | 88 | winding shaft |
| 19 | stopper | 50 | pusher slot | 881 | hole portion |
| 191 | first positioning post | 56 | repositioning member | 271 | shaft portion |
| 21 | top pressing hole | 60 | top pressing mechanism | 89 | lid |
| 22a | positioning post | 61 | top pressing sleeve | 89a | snap portion |
| 22b | positioning groove | 611 | limit portion | 89c | positioning portion |
| 27 | output shaft | 62 | resilient member | 902 | notch |
| 28 | motor | 70 | sticker output box | 91 | sticker compartment |
| 29 | transmission mechanism | 71 | base | 200 | sticker roll |
| 30 | rear cover | 73 | sticker output port | 87 | inner peripheral wall |
| 302 | guide groove | 74 | conveying resistance increasing portion | 90 | outer peripheral wall |
| 303 | socket post | 75 | feeding channel | 92 | rotation resistance increase portion |

DETAILED DESCRIPTION

To make the purpose, technical solutions, and advantages of the embodiments of the present disclosure clearer, the present disclosure will be described in further detail below in conjunction with the accompanying drawings. The components in the embodiments of the present disclosure generally described and illustrated in the accompanying drawings herein may be arranged and designed in a variety of different configurations. Based on the embodiments in the present disclosure, all other embodiments obtained by those skilled in the art without creative labor are within the scope of the present disclosure.

It should be noted that similar symbols and letters denote similar items in the following accompanying drawings, and therefore, once an item is defined in an accompanying drawing, it is not required to be further defined and explained in subsequent accompanying drawings.

Unless otherwise defined, technical terms or scientific terms used in the present disclosure shall have the ordinary meaning understood by those skilled in the art. The terms “first”, “second”, etc. used in the specification and in the claims of the present disclosure do not indicate any order, number, or importance, but are only intended to distinguish between different components. Similarly, the terms “a”, “one”, or “the”, etc. do not indicate a limitation of number, but rather the presence of at least one. The terms such as “include” or “contain” mean that the element or object appearing before the “include” or “contain” covers the element or object listed after the “include” or “include”, and do not exclude other elements or objects. The terms of “center”, “up”, “down”, “left”, “right”, “vertical”, “horizontal”, “inside”, “outside”, etc. are only intended to indicate a relative positional relationship, and when the absolute position of the described object is changed, the relative positional relationship may also be changed accordingly, which is only for the purpose of facilitating the description of the present disclosure and simplifying the description, and is not intended to indicate or imply that the device or element referred to must have a particular orientation, be constructed and operated in a particular orientation, and therefore cannot be construed as a limitation of the present disclosure.

In the description of the present disclosure, it is to be noted that, unless otherwise expressly provided and limited, the terms “mounted”, “connected”, and “coupled” are to be understood in a broad sense. For example, it may be a fixed connection, a removable connection, or a connection in one piece; it may be a mechanical connection or an electrical connection; it may be a direct connection or an indirect connection through an intermediate medium; and it may be a connection within the two elements. For those skilled in the art, the specific meaning of the above terms in the present disclosure can be understood in specific cases.

Some embodiments of the present disclosure are described in detail below in conjunction with the accompanying drawings. The features in the following embodiments may be combined with each other without conflict.

Referring to FIGS. 1 to 14, the present disclosure provides a sticker dispensing device 100, suitable for child behavior management, which may be applied by a parent or a teaching practitioner to train a child’s attention and other behaviors, specifically to output a sticker for rewarding the child when the child completes a designated task. The sticker dispensing device 100 may also be applied for children’s recreational use. The sticker dispensing device 100 is, for example, a portable sticker dispenser. The sticker dispensing device 100 includes a main body 10 and a sticker output box 70, which will be described in detail below.

As shown in FIGS. 1-5, the sticker output box 70 is constructed to be detachably mounted to a box mounting structure of the main body 10, the box mounting structure being configured for assembling the sticker output box 70 to the main body 10. The main body 10 and the sticker output box 70 are held in engagement by a locking mechanism, and the sticker output box 70 can be released when a push rod 43 is actuated to be moved by operating a button 45. The sticker is peelably affixed to a liner paper and coiled into a sticker roll 200. According to Internet, the sticker belongs to a pastable back-drying adhesive paper, which is printed on the back-drying adhesive paper with all kinds of drawings and photographs. The sticker may be the common sticker on the market, as a kind of fashionable product which is cool to the mass of the adolescents and the youths. The sticker can be affixed to stationery, cups and bowls, furniture, electrical appliances, metal wares, porcelain, motorized vehicle or the non-motorized vehicle, mobile phones, the laptops, game consoles, as well as advertising trademarks, industrial indicators, and other multi-element series of products. The sticker has a wide scope of use and is thus a major focus of the printing industry. The sticker can be printed with various colors of cartoon characters and other patterns. The sticker can be arbitrarily pasted and is mostly disposable. There are more varieties of the stickers. The above description of the sticker comes from the website Baidu Baike, which only serves as a description of the sticker, and does not constitute a limitation on the sticker, in addition to the above sticker there are other types of stickers.

Specifically, as shown in FIGS. 5-8, the sticker output box 70 includes a box body and a winding shaft 88, the box body including a base 71 and a lid 89. The lid 89 may be non-detachably fastened to the base 71, or may be detachably fastened to the base 71, in which case the user may replace the sticker roll 200. The box body has a sticker compartment 91 for positioning the sticker roll 200, and the winding shaft 88 is configured to be rotatable when in contact with the liner paper to wind the liner paper. The box body further has a liner conveying path, a sticker output port 73, and a turning peeling portion 86; the turning peeling portion 86 is arranged on the liner conveying path and is disposed at the sticker output port 73, and the turning peeling portion 86 is capable of causing the sticker to be peeled off of the liner paper by conveying the liner paper in a direction different from the travel direction of the sticker. The sticker is diverted at the sticker output port 73 under the action of the turning peeling, where the sticker is output from the sticker output port 73 and the liner paper is stowed on the winding shaft 88 under the winding of the winding shaft 88.

Figure 7:
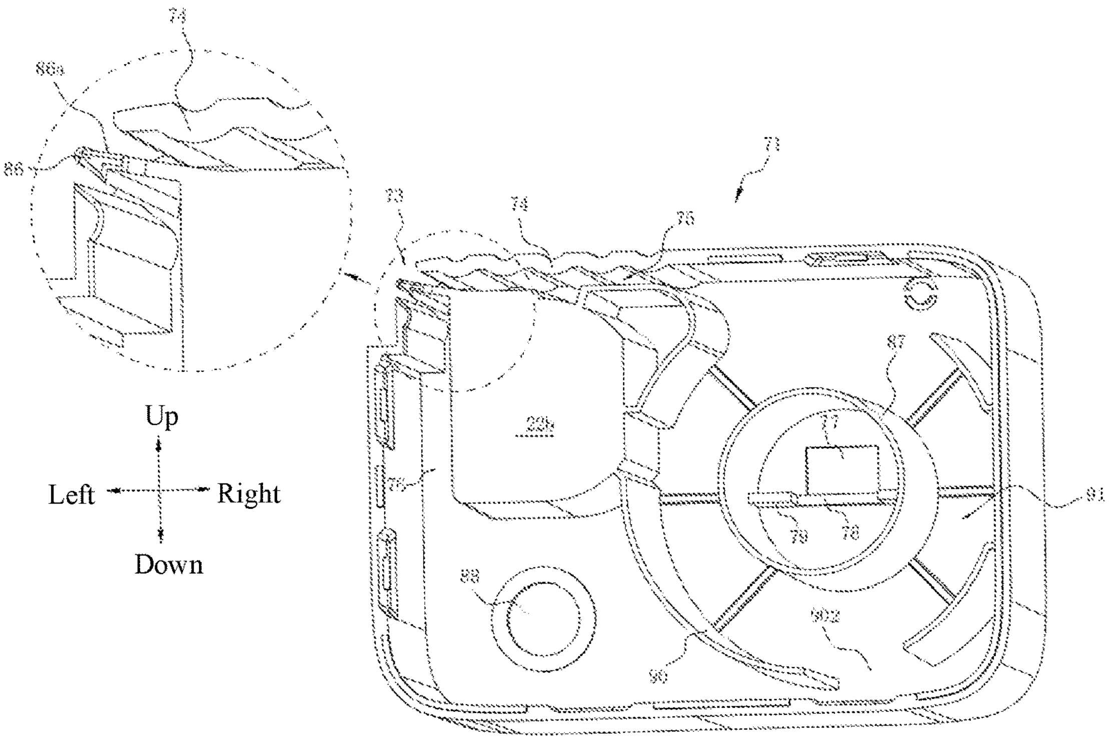
FIG. 7 is a structural schematic view of a base according to some embodiments of the present disclosure.

Referring to FIG. 7, in order to further smoothly output the sticker and prevent sticking of the sticker at the sticker output port 73, the turning peeling portion 86 may extend into the sticker output port 73, and furthermore the turning peeling portion 86 may slightly protrude out of the sticker output port 73 so as to effectively prevent the sticker from adhering to the box body and being unable to be output. At least one end portion of the turning peeling portion 86 in a width direction of the liner paper is formed with a loading port, such that the liner paper can be loaded into between the turning peeling portion 86 and the sticker output port 73 from the loading port, to facilitate the replacement of the sticker roll 200 at a later stage.

Referring further to FIG. 7, a conveying resistance increasing portion 74 is arranged on a side of the box body at an upstream of the sticker output port 73 on the liner conveying path. The conveying resistance increasing portion 74 is configured to increase the conveying resistance of the liner paper in order to put the liner paper in a tensioned state when peeling off the sticker, such that the sticker is easier to peel off from the liner paper when the liner paper is in the tensioned state. The conveying resistance increasing portion 74 includes at least one protruding portion, which protrudes towards the liner paper to press against the liner paper, for causing an increase in the conveying resistance of the liner paper. The conveying resistance increasing portion 74 may be a concave-convex undulating surface formed on an outer wall of the box body. The conveying resistance increasing portion 74 can increase the conveying resistance of the liner paper by pressing against the liner paper or increasing the friction in contact with the liner paper, such that the liner paper is in a tensioned state when the conveying resistance is increased. In particular, the tighter the liner paper at the sticker output port 73 is pulled, the easier the sticker is to be peeled off.

With further reference to FIG. 7, the liner conveying path includes a feeding channel 75 and a receiving channel 76. The sticker is pasted on the liner paper in the feeding channel 75, and the sticker has been peeled off from the liner paper in the receiving channel 76. The liner conveying path is upwardly inclined from the upstream thereof to the sticker output port 73, causing the liner paper to be in the tensioned state when the sticker is peeled off. The turning peeling portion 86 is inclined towards the upper left. The liner paper forms a turn angle greater than 90° at the turning peeling portion 86. The upward inclination of the liner conveying path at the sticker output port 73 and the inclination of the turning peeling portion 86 toward the upper left side, etc. are intended to make the sticker easier to peel, thereby preventing it from adhering to the box body.

In the embodiments, the sticker compartment 91 includes an inner peripheral wall 87 that fits into an inner hole of the sticker roll 200, and an outer peripheral wall 90 that surrounds an outer periphery of the sticker roll 200. The inner peripheral wall 87 and the outer peripheral wall 90 cooperatively define the sticker compartment 91 for placing the sticker roll 200. In the present disclosure, the sticker roll 200 refers to a roll of stickers formed by pasting the sticker on the liner paper and coiled into a roll. In the present embodiments, the sticker roll 200 is wound on a hollow paper tube, which is sleeved to the inner peripheral wall 87. The sticker compartment can retain the sticker roll 200 within the box body without coming loose.

Figure 6:
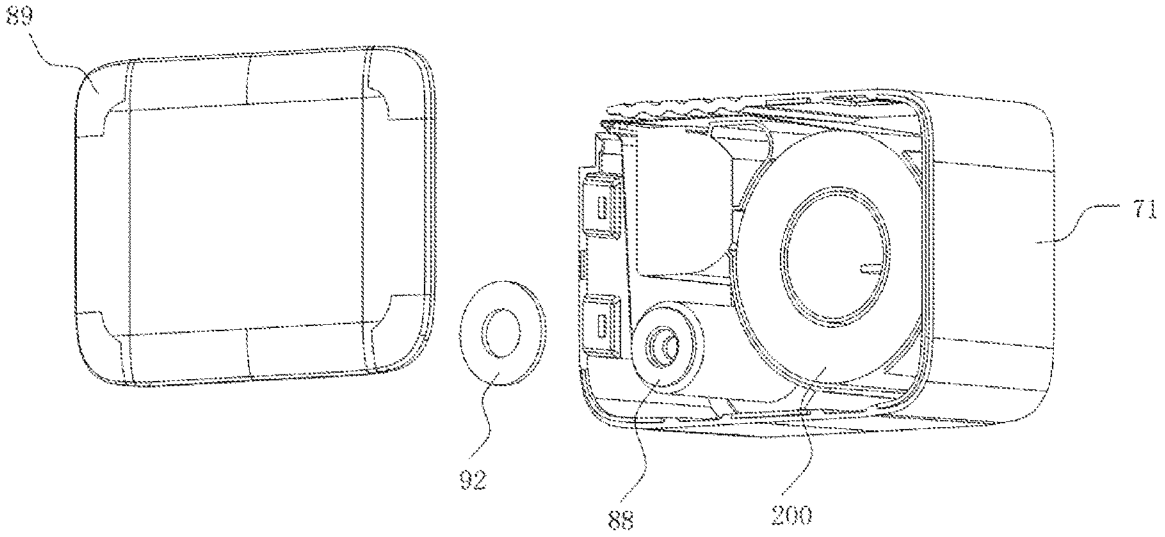
FIG. 6 an exploded schematic view of a sticker output box according to some embodiments of the present disclosure.
Figure 8:
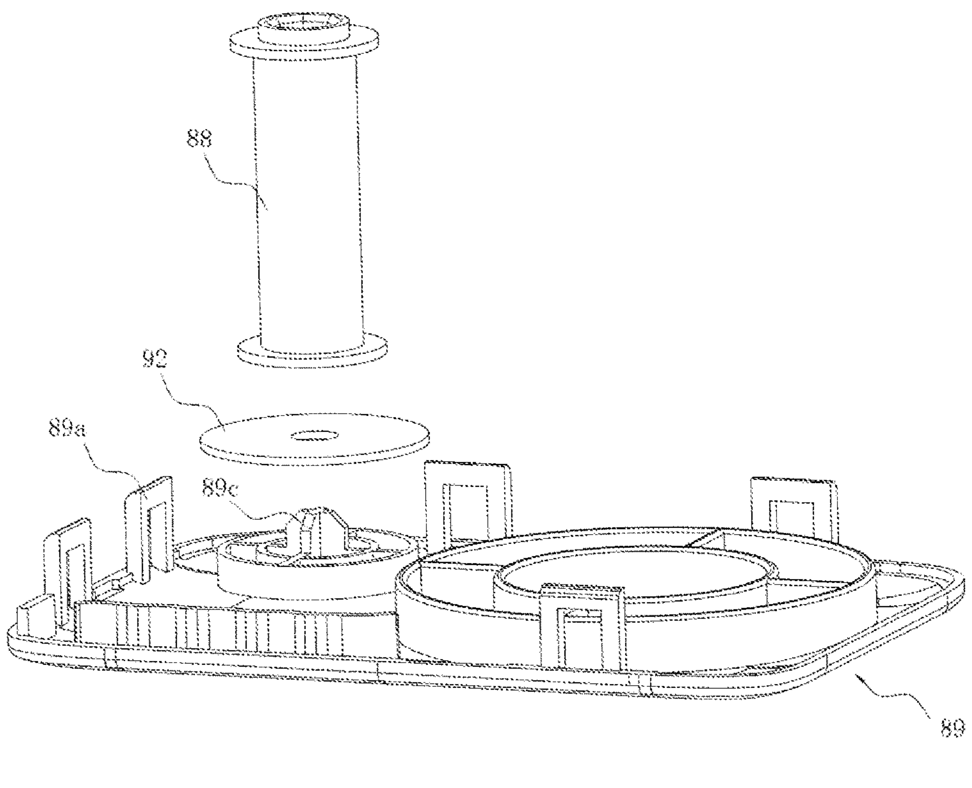
FIG. 8 is a schematic view of an assembly of a winding shaft and a lid according to some embodiments of the present disclosure.
Figure 9:
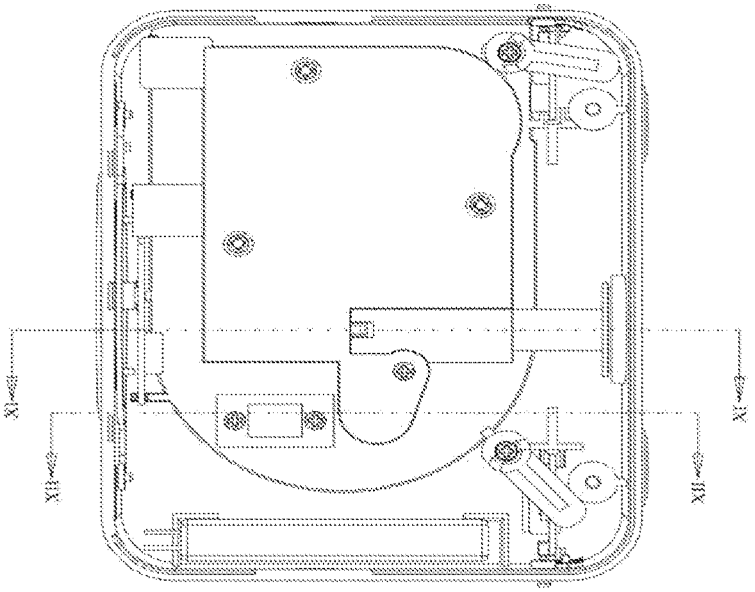
FIG. 9 is a forward-projected front view of the sticker dispensing device in FIG. 1.
Figure 10:
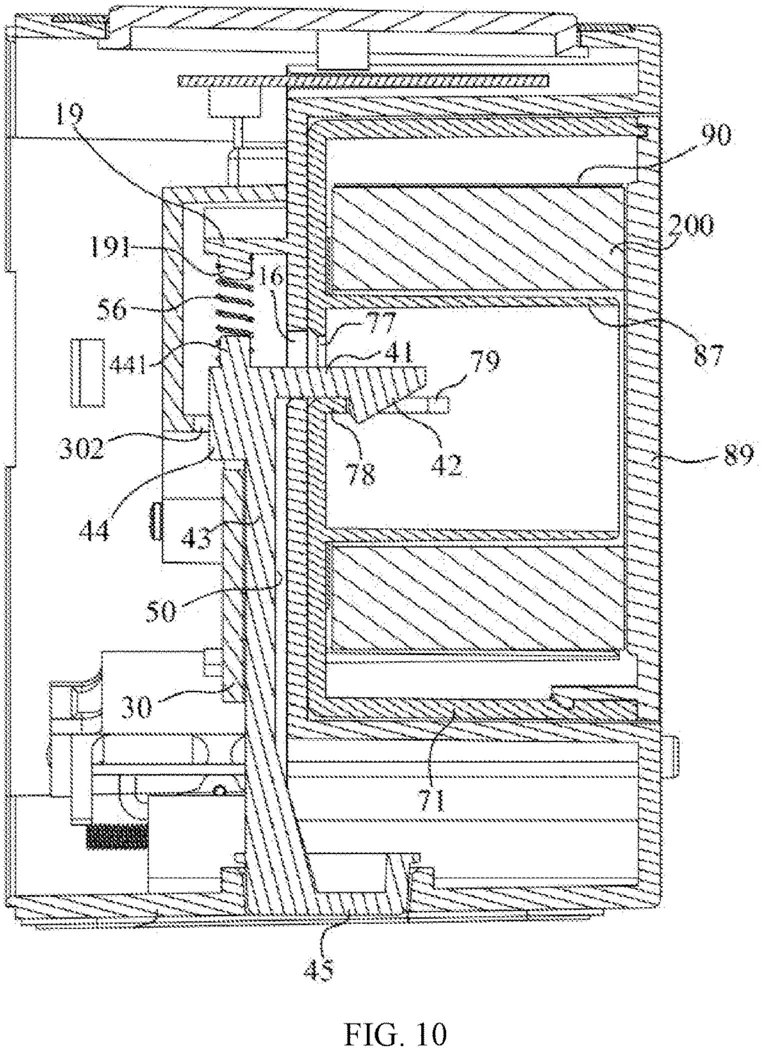
FIG. 10 is a cross-sectional schematic view along line XI-XI in FIG. 9.

Referring to FIGS. 6-8, the box body includes the base 71 and the lid 89, the winding shaft 88 being rotatably positioned between the base 71 and the lid 89. The lid 89 is arranged with a rotation resistance increasing portion 92 configured to increase a rotation resistance of the winding shaft 88, for preventing the liner paper wound on the winding shaft 88 from coming loose. The rotation resistance increasing portion 92 is a friction block in frictional contact with a shaft end face of the winding shaft 88. In the embodiments, the friction block may be a flexible friction block made of sponge or rubber, or other flexible material, which, when rubbing against the end surface of the winding shaft 88, can increase the resistance to rotation of the winding shaft 88, thereby preventing unwinding of the wound liner paper. In other words, the rotation resistance increasing portion 92 can increase the rotation resistance of the winding shaft 88. Especially in a case where the sticker output box 70 is removed without power drive, the provision of the rotation resistance increasing portion 92 can prevent the liner paper wound on the winding shaft 88 from rotating with the winding shaft 88, such that the liner paper is not loosened and unwound. In some embodiments, the friction block is combined with a resilient member, and specifically, the resilient member is arranged between the friction block and the lid 89. The resilient member is configured to apply force in a direction that causes the friction block to abut against the winding shaft 88, and the resilient member may be a cylindrical spring, etc. In some embodiments, the friction block may be configured as a positioning member of the winding shaft 88, such as a positioning portion 89*c* in FIG. 8; however, it is necessary to provide the positioning member as a movable structure and to arrange a spring between the positioning member and the lid 89 such that the positioning portion 89*c* abuts against the winding shaft 88, which also achieves the effect of increasing the rotation resistance of the winding shaft 88.

Figure 3:
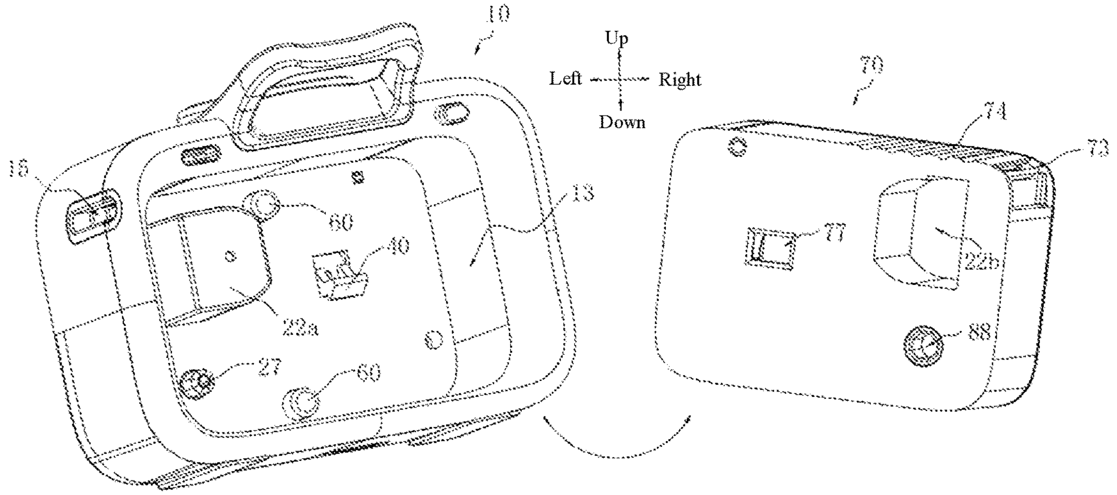
FIG. 3 is another exploded schematic view of the sticker dispensing device in FIG. 1.
Figure 4:
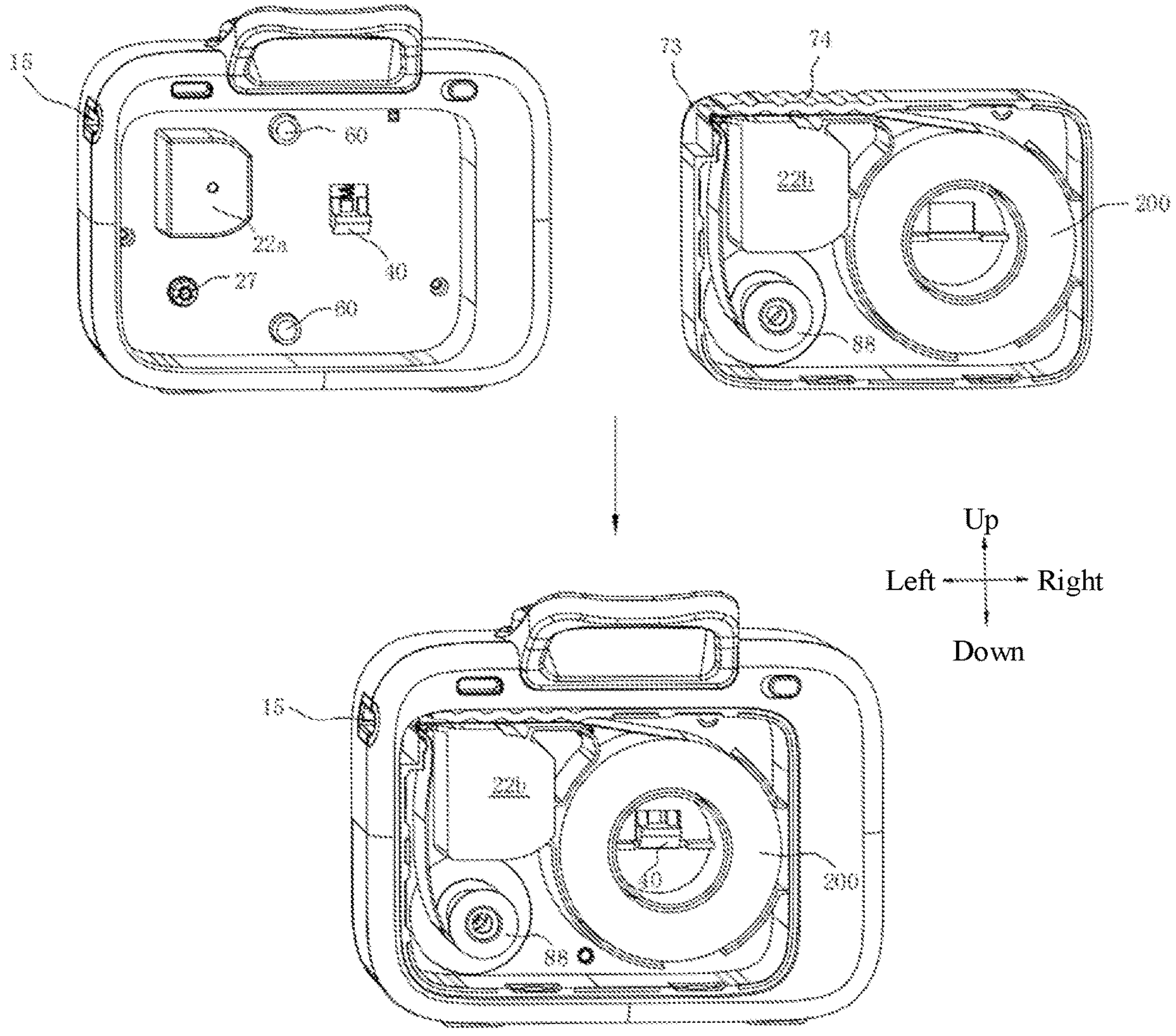
FIG. 4 is further another exploded schematic view of the sticker dispensing device in FIG. 1.

Referring to FIGS. 3 and 4, the box mounting structure includes a positioning post 22*a* having a motor 28 built-in, and the box body is arranged with a positioning groove 22*b* receiving the positioning post 22*a* and adapted to the positioning post 22*a*. The positioning post 22*a* extends into the positioning groove 22*b* to realize a positioning fit. The motor 28 being arranged in the positioning post 22*a* may significantly reduce the size of the main body 10 in the thickness direction and enable the sticker output box 70 to be firmly arranged on the main body 10.

Figure 12:
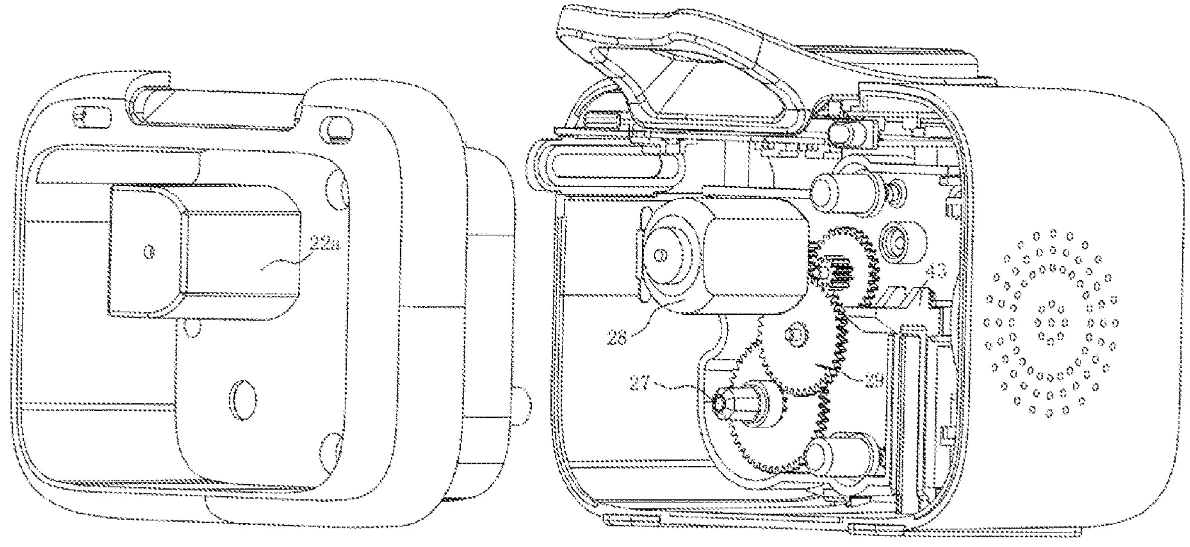
FIG. 12 is an exploded schematic view of a main body of the sticker dispensing device in FIG. 1.

As shown in FIG. 12, the main body 10 includes: the box mounting structure for removably mounting the sticker output box 70. The main body 10 further defines a paper outlet 15 in communication with the sticker output port 73. With further reference to FIGS. 3 and 4, the sticker output box 70 may be disassembled as a whole from the main body 10 for replacement, which is convenient for the user. The sticker output port 73 and the paper outlet 15 are arranged correspondingly and facing each other.

As shown in FIGS. 9 to 13, the box mounting structure includes a mounting cavity 13 for receiving the sticker output box 70, a locking mechanism for locking the sticker output box 70, and an unlocking mechanism for releasing the sticker output box 70.

The sticker output box 70 involved in the present disclosure is specifically described below.

As shown in conjunction with FIGS. 1-11, the sticker output box 70 and the main body 10 together form the sticker dispensing device 100, and the main body 10 has a box mounting structure for receiving the sticker output box 70. The box mounting structure enables the sticker output box 70 to be detachably mounted on the main body 10. In a state of use of the sticker dispending device 100, the sticker output box 70 and the main body 10 are combined with each other. When it is necessary to replace the sticker output box 70, the user can release the sticker output box 70 by the unlocking mechanism. That is, the user only needs to directly replace the sticker output box 70 without directly replacing the sticker. Of course, the sticker output box 70 can be made into a detachable structure, and the user can replace only the sticker roll 200, which may reduce the user's cost of use.

As shown in FIG. 7, the sticker output box 70 has a sticker compartment 91 that receives the sticker roll 200, and the sticker compartment 91 is jointly defined by an inner peripheral wall 87 and an outer peripheral wall 90. The inner peripheral wall 87 is a circular wall portion, and the outer peripheral wall 90 is a disconnected circular wall portion. The outer peripheral wall 90 defines a notch 902 that may facilitate the user to place the sticker roll 200, and an inner bottom wall of the inner peripheral wall 87 defines a locking hole 77. The locking mechanism on the main body 10 includes a movable snap 40, the movable snap 40 including a push rod 43, and the push rod 43 is arranged with a hook 42. The hook 42 of the movable snap 40 is snapped with the locking hole 77 to realize locking of the sticker output box 70. To improve the structural strength of the locking hole 77, a reinforcing rib 78 and a reinforcing rib plate 79 are arranged at a periphery of the locking hole 77. A winding shaft 88 for winding a liner paper after peeling off the sticker is rotatably positioned inside the sticker output box 70. Specifically, the sticker output box 70 includes a base 71 and a lid 89, and the winding shaft 88 is rotatably clamped and positioned between the base 71 and the lid 89. In addition, as previously described, to prevent the liner paper from being loosened and unwound caused by the winding shaft 88 reversing under the pulling of the liner paper, a rotation resistance increasing portion 92 is arranged at an end face of the winding shaft 88, and the rotation resistance increasing portion 92 may be arranged between the lid 89 and the winding shaft 88, i.e., between the end face of the winding shaft 88 opposite to the lid 89 and the lid 89. In other embodiments, the rotation resistance increasing portion 92 may be arranged between the end surface of the winding shaft 88 opposite the base 71 and the base 71, and the rotation resistance of the winding shaft 88 may be increased by increasing the friction.

Further in conjunction with FIG. 7, to realize the mounting and positioning of the sticker output box 70, an outer wall of the sticker output box 70 cooperates with a cavity wall of the main body 10. To further improve the stability of the positioning, a positioning post 22*a* is arranged on the main body 10, and correspondingly, a positioning groove 22*b* is defined on the sticker output box 70 that cooperates with the positioning post 22*a*, and the positioning post 22*a* extends into the mounting cavity 13. To reduce the thickness of the main body 10, a motor 28 is arranged in the positioning post 22*a*. Specifically, a groove is defined within the positioning post 22*a*, and the motor 28 is arranged within the groove. The positioning groove 22*b* is a groove recessed inwardly from a bottom wall of the base 71, and the positioning post 22*a* extends into the positioning groove 22*b* to realize the mounting and positioning of the sticker output box 70.

A liner conveying path is formed on an upper portion of the base 71, and a feeding channel 75 and a receiving channel 76 are arranged in the liner conveying path. The feeding channel 75 is formed by a top wall of the base 71 and an inner wall below the top wall, and the liner paper to which a sticker is affixed passes through the feeding channel 75, such that the sticker together with the liner paper is conveyed to the sticker output port 73 and the sticker is peeled off from the liner paper at the sticker output port 73. Specifically, a turning peeling portion 86 is arranged at the sticker output port 73, and the turning peeling portion 86 serves to guide the liner paper to be conveyed in a direction different from the travel direction of the sticker such that the sticker is peeled off from the liner paper. The winding shaft 88 is disposed below the positioning groove 22*b*, and the feeding channel 75 is disposed above the positioning groove 22*b*. The receiving channel 76 is disposed below the sticker output port 73, and the liner paper after being peeled off from the sticker is wound on the winding shaft 88 through the receiving channel 76.

To enable the sticker to be peeled off from the liner paper without producing defects such as sticking, a liner paper tensioning structure may be arranged. Specifically, a conveying resistance increasing portion 74 is arranged on a top wall of the feeding channel 75 to increase the resistance of the liner paper during conveying, and the increased resistance can cause the liner paper to be in a tensioned state before the sticker is peeled off. The conveying resistance increasing portion 74 may be at least one protruding portion extending downwardly from the top wall of the base 71, or it may be a continuous concave-convex undulating surface formed by multiple protruding portions. The protruding portions serve to tension the liner paper by pressing downwardly against the liner paper. In addition, to further tension the liner paper, the feeding channel 75 is arranged to gradually incline to the upper left, and an upper surface of the turning peeling portion 86 is arranged with an inclined surface 86*a* inclined to the upper left, such that the turning peeling portion 86 is warped to the upper left. In addition, to facilitate the peeling of the liner paper, the turning peeling portion 86 may not only be arranged corresponding to the position of the sticker output port 73, but also extending into the sticker output port 73, and even slightly protruding from the sticker output port 73. The specific structure is shown with reference to FIG. 7.

Referring to FIGS. 6 and 8, the lid 89 and the base 71 of the sticker output box 70 are joined by multiple snap portions 89*a*. Moreover, to prevent the liner paper wound on the winding shaft 88 from loosening up under the pulling force of the liner paper, a rotation resistance increasing portion 92 is arranged between the winding shaft 88 and the lid 89, and a positioning portion 89*c* is arranged on the lid 89. The positioning portion 89*c* is configured to position the winding shaft 88 such that the winding shaft 88 rotatable about an axis thereof. Referring to FIG. 3, a bottom of the winding shaft 88 has an inner cavity, and a transmission key is arranged within the inner cavity to be adapted to an output shaft 27. That is, an outer spline is arranged on an outer circumference of the output shaft 27, and an inner spline is arranged in the inner cavity of the winding shaft 88, and the inner spline and outer spline cooperate to realize the transmission connection.

In other embodiments, the sticker output box 70 may be of other shapes and configurations, and simple deformations implemented under the teachings of the present disclosure as well as other technical solutions without creative labor fall within the scope of the present disclosure.

The main body 10 involved in the present disclosure is specifically described below.

Figure 2:
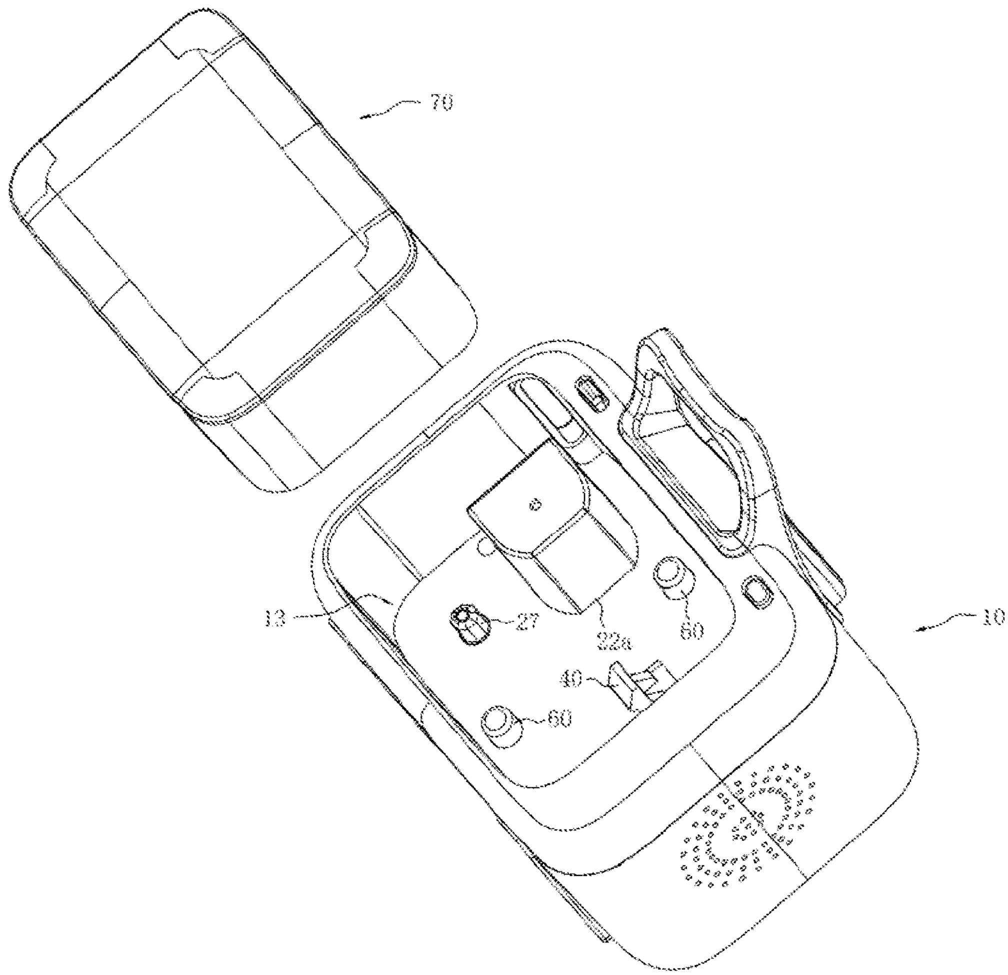
FIG. 2 is an exploded schematic view of the sticker dispensing device in FIG. 1.
Figure 5:
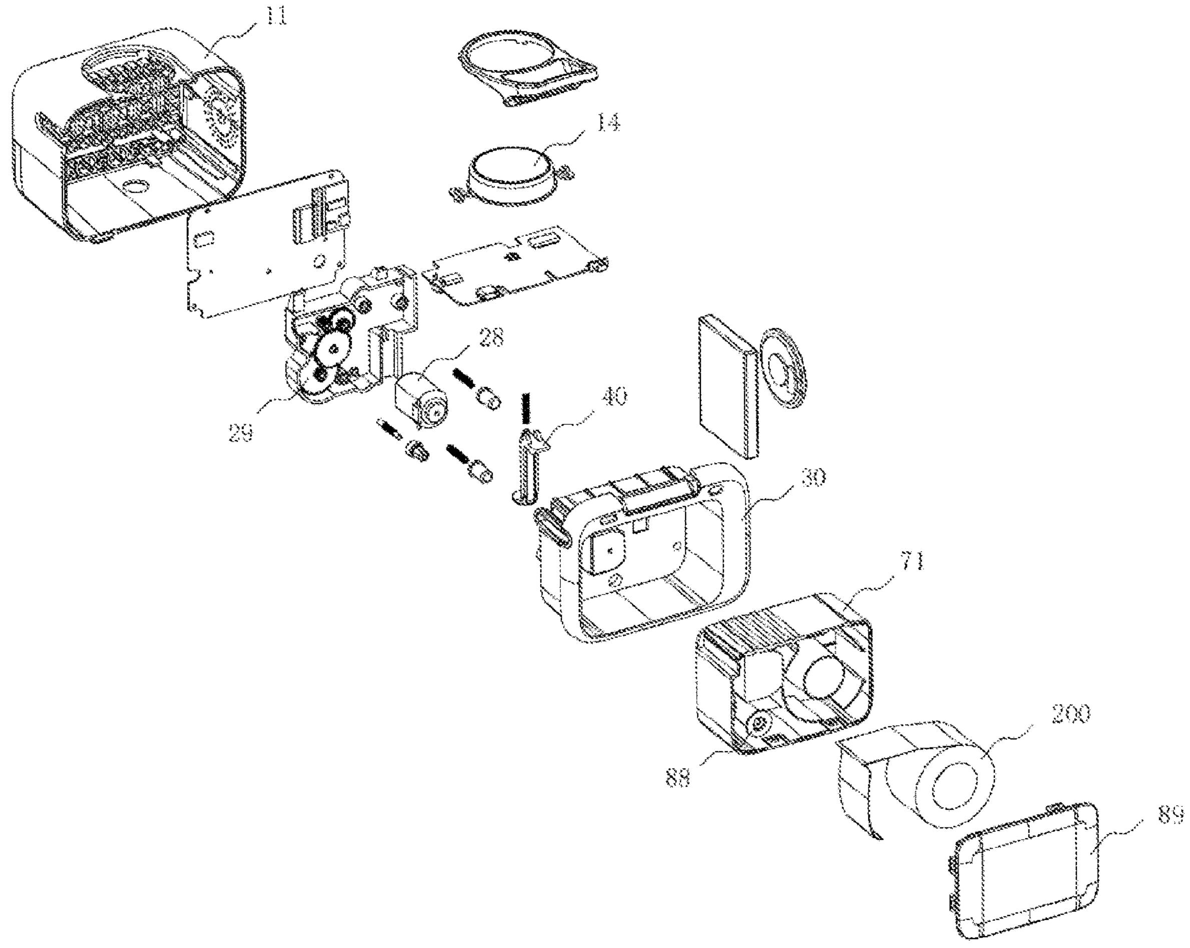
FIG. 5 is yet another exploded schematic view of the sticker dispensing device in FIG. 1.
Figure 13:
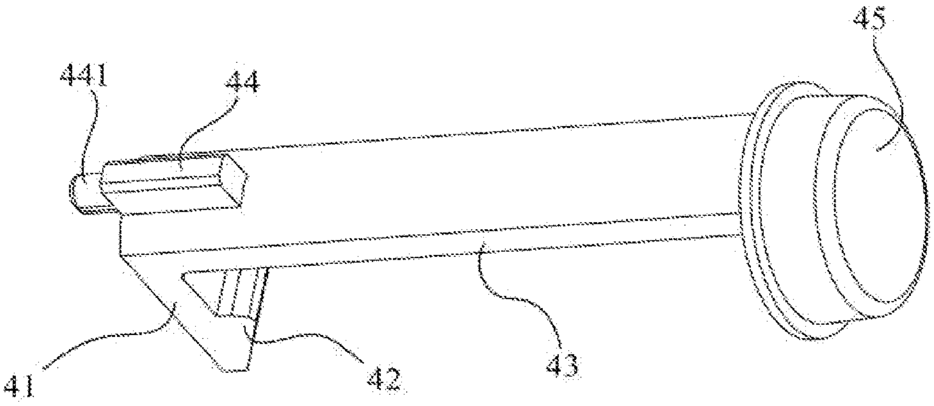
FIG. 13 is a perspective schematic view of a movable snap in a main body according to some embodiments of the present disclosure.
Figure 14:
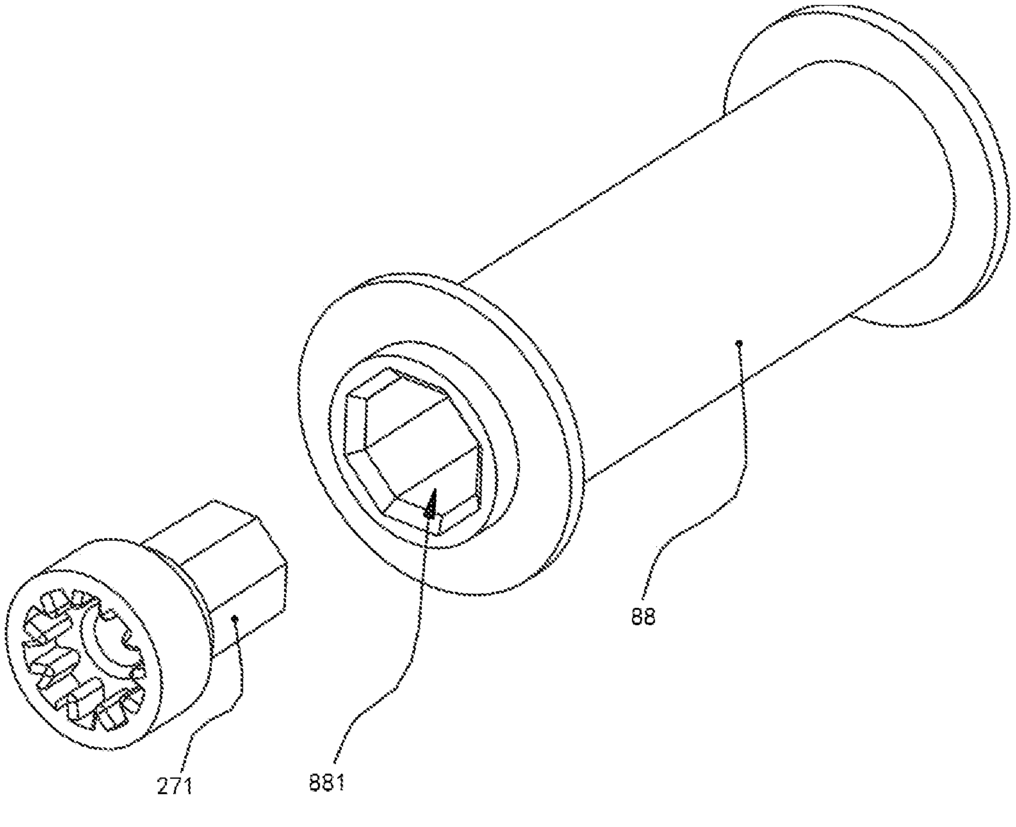
FIG. 14 is a perspective schematic view of a coupling structure according to some embodiments of the present disclosure.

Referring to FIGS. 2 and 3, a box mounting structure is arranged on the main body 10, and the box mounting structure includes a mounting cavity 13, a locking mechanism, and an unlocking mechanism, etc. As shown in FIG. 5, the main body 10 includes a front cover 11 and a rear cover 30, and power consuming components such as a circuit board are arranged in a cavity between the front cover 11 and the rear cover 30. As shown in FIG. 13, the locking mechanism and the unlocking mechanism include a movable snap 40, the movable snap 40 including a push rod 43, a button 45, and a hook 42. The hook 42 is disposed on an end of the push rod 43, and the button 45 is disposed on the other end of the push rod 43, the hook 42 being connected to the push rod 43 through a connecting arm 41.

As shown in FIGS. 10-13, in the embodiments, the movable snap 40 switches between a locking position and a releasing position in a movable manner. For example, the connecting arm 41 may be an elastic arm and changes the position of the hook 42 through elastic deformation to realize the position switching. The connecting arm 41 may change the position of the hook portion 42 by rotation. It is to be understood that the sticker output box 70 may be detachably mounted by means of magnetism or the like.

Further, the front cover 11 defines a switch hole 16, and the connecting arm 41 may be translatably disposed within the switch hole 16 and the locking hole 77 to enable the movable snap 40 to be switched between the locking position and the releasing position. In the embodiments, by setting the connecting arm 41 within the switch hole 16, the space of the mounting cavity 13 may be less occupied, and the connecting arm 41 may be positionally limit, thereby preventing the connecting arm 41 from deviating excessively from its working position.

In some embodiments, the connecting arm 41 extends in a direction perpendicular to the push rod 43; the connecting arm 41 is disposed between the front cover 11 and the rear cover 30, and the front cover 11 or the rear cover 30 further defines a slide groove structure such as a pusher slot 50 that can be slidably cooperated with the push rod 43.

In the embodiments, the provision of the push rod 43 and the slide groove that fits therewith makes the translation of the movable snap 40 smoother. In addition, the front cover 11 or the rear cover 30 is further arranged with a repositioning member 56, the repositioning member 56 being compressed and clamped between the movable snap 40 and the front cover 11 (or the rear cover 30) to maintain the movable snap 40 in the locking position. Specifically, the repositioning member 56 may be a spring or other resilient component. The specific mounting structure of the repositioning member 56 may be shown with reference to FIG. 10, where the rear cover 30 is arranged with a stopper 19 on a side of the rear cover 30 with a transmission mechanism 29, and the stopper 19 is arranged with a first positioning post 191 that extends toward the locking hole 77; a connection part of the push rod 43 and the connecting arm 41 is arranged with a protruding guide rail 44 on a side of the connection part away from the rear cover 30, the guide rail 44 extends in the same direction as a sliding direction of the push rod 43, and an end face of the guide rail 44 towards the stopper 19 is arranged with a second positioning post 441; the main body 10 defines a guide groove 302 for the guide rail 44 to be accommodated and slid. The repositioning member 56 may be a cylindrical spring, with an end of the repositioning member 56 being sleeved on the first positioning post 191 and the other end being sleeved on the second positioning post 441.

Figure 11:
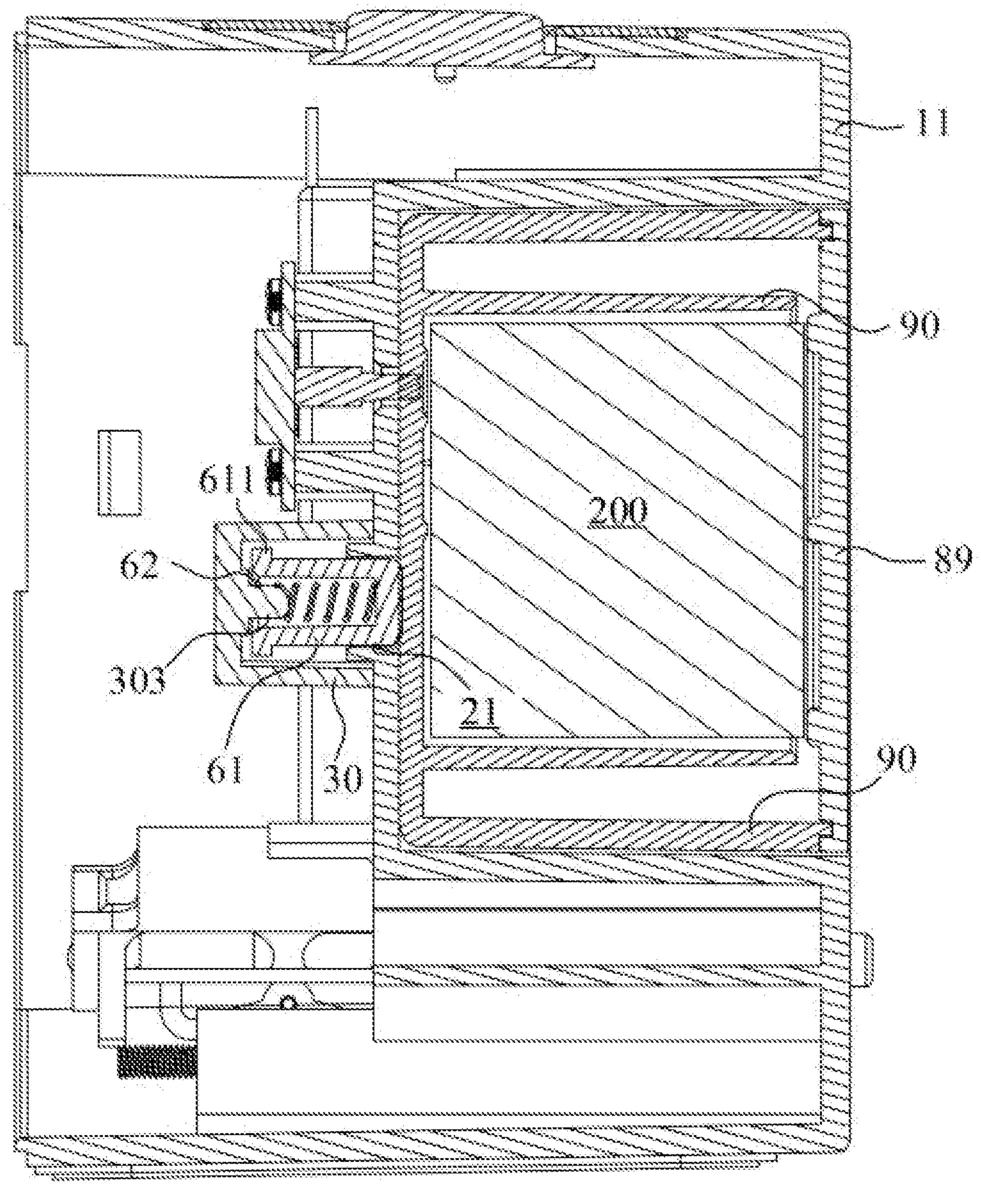
FIG. 11 is a cross-sectional schematic view along line XII-XII in FIG. 9.

As shown in FIG. 11, the main body 10 further includes a top pressing mechanism 60 passing through a top pressing hole 21 to outwardly press the sticker output box 70. Further, the top pressing mechanism 60 includes a top pressing sleeve 61 and a resilient member 62, the top pressing sleeve 61 has an inner cavity with an open mouth on a side, and the open end of the top pressing sleeve 61 extends into the cavity between the front cover 11 and the rear cover 30. An outer peripheral surface of the open end of the top pressing sleeve 61 is arranged with a limit portion 611, and the resilient member 62 is embedded in the inner cavity of the top pressing sleeve 61.

The drive mechanism includes a motor 28 and a transmission mechanism 29, where the motor 28 can drive the output shaft 27 through the transmission mechanism 29. The transmission mechanism 29 is arranged on the front cover 11 and the rear cover 30, the rear cover 30 is fixedly connected to the front cover 11, and an inner side of the rear cover 30 abuts against the resilient member 62. The transmission mechanism 29 may be a gear train transmission mechanism, which realizes the transmission through multiple gears meshing with each other.

In the embodiments, the top pressing sleeve 61 may be prevented from being loosened from the front cover 11 in an unloaded state, i.e., a disassembled state of the sticker output box 70, by means of the limit portion 611 being abutted against the inner side of the top pressing aperture 21. The resilient member 62 extends into the inner cavity of the top pressing sleeve 61, such that telescoping of the resilient member 62 may be better realized. In some embodiments, the resilient member 62 is a compression spring, and the inner side of the rear cover 30 is arranged with a socket post 303 for the elastic member 62 to be sleeved on, which are easy to procure and easy to install. In addition, the sticker dispensing device 100 may be arranged with an operation portion 14, and the sticker can be output by pressing the operation portion 14 during a set interval.

In the embodiments, during a conveying process of the sticker, the unrolled sticker roll 200 passes through the roll inlet into the feeding channel 75 and enters the receiving channel 76 after being turned by the turning peeling portion 86, and finally the liner paper is wound up by the winding shaft 88. By extending the motor 28 to be arranged inside the sticker output box 70, the overall thickness of the sticker dispensing device 100 is greatly reduced, such that the layout of parts of the sticker dispensing device 100 is facilitated, thereby making the corresponding structure more compact and thus the product more convenient to carry.

In the embodiments, the sticker output box 70 is separably combined with the main body 10, and the winding shaft 88 and the motor 28 are connected through a separable coupling structure. In conjunction with FIGS. 12 and 14, the coupling structure includes a shaft portion 271, and a hole portion 881 that is transmission-fit to the shaft portion 271. In the embodiments, the shaft portion 271 is arranged on the main body 10, specifically, the shaft portion 271 is formed on the output shaft 27 and thus indirectly arranged on the main body 10, and there is a mating spline structure between the shaft portion 271 and the output shaft 27. In the embodiments, the hole portion 881 is arranged on the sticker output box 70, specifically, the hole portion 881 is formed on the winding shaft 88. The positions of the shaft portion 271 and the hole portion 881 may be counterbalanced. That is, one of the shaft portion 271 and the hole portion 881 is arranged on the main body 10 and the other is arranged on the sticker output box 70. The motor 28 can rotate the output shaft 27 through the transmission mechanism 29, and the output shaft 27 rotates the winding shaft 88 through the separable coupling structure. By controlling the rotation direction of the motor 28, the winding shaft 88 can be driven to forward and reverse rotation. The outer periphery of the shaft portion 271 and the inner periphery of the hole portion 881 are adapted to each other. In some embodiments, the shaft portion 271 may have multiple toothed portions evenly distributed along its outer periphery, and the hole portion 881 may have multiple toothed portions evenly distributed along its inner periphery. The sticker dispensing device 100 of the present disclosure may be provided such that after the winding shaft 88 is rotated positively to tighten the liner paper and peel off the at least one sticker, the winding shaft 88 is controlled to reverse at a set angle to slacken the liner paper such that the coupling structure can be easily separated. After the forward rotation of the winding shaft 88 stops, the liner paper is tightened to provide a tight fit between the shaft portion 271 and the hole portion 881; after the reverse rotation of the winding shaft 88 stops, the liner paper is slackened to provide a loose fit between the shaft portion 271 and the hole portion 881.

In other embodiments, the sticker dispensing device 100 is configured to be capable of operably outputting the sticker in at least a first mode and a second mode, including a body and a control unit; the sticker dispensing device 100 further includes a toggle switch, the toggle switch being configured such that, upon attachment of an optionally-attachable sticker output box 70 to the body, the toggle switch is caused to produce a mode switching trigger. The control unit is electrically connected to the toggle switch and the control unit controls to switch between the first mode and the second mode based on the mode switching trigger from the toggle switch. The optionally-attachable sticker output box 70 includes at least a first box and a second box, the first box being associated to the first mode and the second box being associated to the second mode. The body is capable of recognizing whether the first or second box is attached thereto by mechanical triggering, inductive recognition, etc., and thus operating in the corresponding mode. In some embodiments, the toggle switch is a mechanically triggered switch, such as a microswitch. The toggle switch is in a turned-on state when the first box is attached to the body, and the toggle switch is in a turned-off state when the second box is attached to the body. The sticker dispensing device 100 further includes a timing unit, and a user interface portion for receiving a sticker output instruction from the user; the first mode is configured such that, the control unit determines, based on a preset condition, whether or not to control the sticker output mechanism to output the sticker in response to the sticker output instruction; the second mode is configured such that, the control unit controls the sticker output mechanism to output the sticker in response to the sticker output instruction.

For the sticker dispensing device 100 supporting switchable modes, different sticker output boxes 70 correspond to different operating modes. For example, in some embodiments, the first mode is a training mode and the second mode is an entertainment mode. Children cannot operate the device by themselves in the training mode to output stickers at will, which serves to prevent cheating. In addition, the entertainment mode improves the ease of playability of the product. In the training mode, children must complete a set training task before they can get a sticker. In the entertainment mode, the children can operate themselves to output the sticker they want to obtain.

The present disclosure further discloses an attention training method for children, applied to the sticker dispensing device 100. The training method includes: setting a training time for a trainee; initiating a time countdown displayed on a screen according to the training time; outputting a reminder signal to remind the trainee to end a current training; and outputting a sticker to reward the trainee after obtaining a sticker dispensing instruction.

That is, the present disclosure provides an attention training method for children, which may be performed by an attention training device (hereinafter referred to as a training device), which may specifically be a sticker dispensing device 100, the sticker dispensing device 100 including an operation portion 14, a display screen, and a paper outlet 15. In particular, the method is performed by one or more processors within the training device, to realize the steps of S101 to S104 as follows.

S101, setting a training time for a trainee.

In the embodiments, the training device may be a portable printing device, such as a portable printer. The portable printer includes at least a printing module, a display module, and a control module, the control module including a processor and a memory, the memory storing a computer program, and the computer program being capable of being executed by the processor, in order to realize all of the steps in the embodiments.

In the embodiments, the training device supports a function to set the training time for attention training, by which a user or a parent can set the training time required for the attention training.

The training time is comprehensively determined according to an actual situation of the trainee, the program of training, and other factors. For example, the training time may be set to 5 minutes, 10 minutes, 15 minutes, 30 minutes, etc., and the present disclosure does not make any specific limitations.

S102, initiating a time countdown displayed on a screen according to the training time.

In the embodiments, after the user sets the training time and initiated the training, the training device may display a time countdown interface of the training time on the display module, for the user and the trainee to understand a remaining time of the attention training.

S103, outputting a reminder signal to remind the trainee to end a current training.

S104, outputting a sticker to reward the trainee after obtaining a sticker dispensing instruction.

Further, the outputting a sticker to reward the trainee after obtaining a sticker dispensing instruction is specified as that: the trainee is able to operate the operation portion to generate the sticker dispensing instruction only after the reminder signal is output; or the sticker is output only after the sticker dispensing instruction is obtained for the first time. In the embodiments, after the countdown time is over, the training device may output the reminder signal to remind the trainee to end the current phase of training. The reminder signal may be a sound signal, a light signal, or an acousto-optic signal, etc., without specific limitation of the present disclosure. In addition, the sticker dispensing instruction may be generated by the trainee or a supervisor by operating the operation portion 14, or may be generated by an electronic device such as a mobile phone or a tablet computer.

In the embodiments, after the training is ended, the trainee or the supervisor may operate a designated key of the training device, such as a power button, and the training device may output a sticker through the paper outlet 15 to reward the trainee.

Specifically, sticker data corresponding to the sticker is stored in the training device, and after the training device receives the sticker dispensing instruction, it reads the sticker data and then restricts the sticker data to a printing medium through a printing mode, so as to obtain a corresponding sticker.

In the embodiments, the sticker plays a role similar to that of a small stamp, which can be used as a reward of a merely honorary nature or a reward of a token nature, and the present disclosure does not make any specific limitations.

In summary, in the present embodiments, when carrying out an attention training for children, it is only necessary to set the training time, and there is no need for the parents to carry out a real-time supervision of the attention training process, which saves the parents' energy.

In addition, the rewards can be obtained by the children independently, which improves the interest of the children in the attention training process and the enthusiasm for training.

In the embodiments, the trainee is able to operate the operation portion to generate the sticker dispensing instruction only after the reminder signal is output, so as to avoid distracting the trainee by operating the sticker dispensing device during the training process. Further, when the sticker dispensing device 100 is in a dormant or switched-off state, an operation on the operation portion 14 can illuminate the display screen and make the sticker dispensing device 100 in an operable state. The operation part 14 may be a key, a touch part, or an electronic device, where the key may be a mechanical key, the touch part may be a commonly used touch screen or touch pad, and the electronic device may be a mobile phone or a tablet computer, etc. In the embodiments, the operation portion 14 further functions as a power button, and pressing the operation portion 14 will illuminate the screen, causing the sticker dispensing device 100 to be in an operable working state.

Although certain sticker output boxes, sticker dispensing devices, and attention training methods according to the teachings of the present disclosure are described herein, the coverage of the present disclosure is not limited thereto. Rather, this present disclosure covers all embodiments of the teachings of the present disclosure that fall squarely within the scope of permissible equivalents.

The illustrations of the embodiments described herein are intended to provide a general understanding of various embodiments. The illustrations are not intended to be a complete description of all components and features of devices and systems utilizing the structures or methods described herein. Many other embodiments will be apparent to those skilled in the art upon reading the present disclosure. Other embodiments can be utilized and derived from the present disclosure, allowing structural and logical substitutions and changes to be made without departing from the scope of the present disclosure. Further, the illustrations are representative only and may not be drawn to scale. Certain proportions in the illustrations may be enlarged, while other proportions may be minimized. Accordingly, the present disclosure and the accompanying drawings are considered illustrative and not limiting.

While this specification contains many details, these should not be construed as limitations on the scope of the present disclosure or the scope of protection that may be claimed, but rather as descriptions of particular features of particular embodiments of the present disclosure. Certain features described in this specification in the context of individual embodiments may also be realized in combination in a single embodiment. Conversely, various features described in the context of a single embodiment may also be realized in multiple embodiments, either individually or in any suitable sub-combination. Moreover, although features may be described above as functioning in certain combinations and even initially claimed as such for protection, one or more features from the combination for which protection is claimed may in some cases be deleted f, and the combination for which protection is claimed may be directed to a sub-combination or a variation of a sub-combination.

Similarly, while operations and/or actions are depicted in the accompanying drawings and are described herein in a particular order, this should not be construed as requiring that the operations be performed in the particular order shown or in a sequential order, or requiring that all of the illustrated operations be performed in order to achieve a desired result. In some cases, multitasking and parallel processing may be advantageous. In addition, the separation of the various system components in the embodiments described above should not be construed as requiring such separation in all embodiments, and it should be understood that any of the described program components and systems may generally be integrated together in a single software product or packaged into multiple software products.

One or more embodiments of the present disclosure may be referred to herein, individually and/or collectively, by the term "application," which is for convenience only and is not intended to voluntarily limit the scope of the present application to any particular application or application concept. Furthermore, although particular embodiments are shown and described herein, it should be understood that any subsequent arrangement designed to accomplish the same or similar purposes may be substituted for the particular embodiments shown. The present disclosure is intended to cover any and all subsequent modifications or variations of the various embodiments. Combinations of the above embodiments, as well as other embodiments not specifically described herein, will be apparent to those skilled in the art upon reading this specification.

The Abstract section of the present disclosure is provided with the understanding that it is not intended to interpret or limit the scope or meaning of the claims. In addition, in the preceding detailed description, various features may be combined or described in individual embodiments for the purpose of simplifying the present disclosure. The present disclosure should not be construed as reflecting an intent that the embodiments claimed for protection require more features than those expressly documented in each claim. Rather, as reflected in the following claims, the subject matter of the present disclosure may relate to fewer than all features of any disclosed embodiment. Accordingly, the following claims are combined into a detailed description in which each claim independently represents a separate limitation of the subject matter claimed for protection.

The preceding detailed description is intended to be considered illustrative rather than limiting, and it should be understood that the appended claims, including all equivalents, are intended to limit the scope of the present disclosure. The claims should not be construed to be limited to the order or elements described unless indicated. Accordingly, all embodiments falling within the scope and spirit of the appended claims and their equivalents are claimed to protect.

What is claimed is:

1. A sticker output box, constructed to be detachably mounted to a box mounting structure of a sticker dispensing device; wherein a sticker is peelably affixed to a liner paper and coiled into a sticker roll, and the sticker output box comprises:

a box body, comprising a sticker compartment for positioning the sticker roll; and a winding shaft, configured to be rotatable when in contact with the liner paper to wind the liner paper;

wherein the box body further comprises a liner conveying path, a sticker output port, and a turning peeling portion; the turning peeling portion is arranged on the liner conveying path and is disposed at the sticker output port, and the turning peeling portion is configured to cause the sticker to be peeled off of the liner paper by conveying the liner paper in a direction different from a travel direction of the sticker;

wherein at least one end portion of the sticker output port in a width direction of the liner paper is formed with a loading port, and the liner paper is configured to be loaded into between the turning peeling portion and the sticker output port from the loading port;

wherein the box mounting structure comprises a positioning post with a motor built-in, and the box body is arranged with a positioning groove receiving the positioning post and adapted to the positioning post.

2. The sticker output box according to claim 1, wherein the turning peeling portion extends into the sticker output port; or, the turning peeling portion protrudes out of the sticker output port.

3. The sticker output box according to claim 1, wherein a conveying resistance increasing portion is arranged on a side of the box body at an upstream of the sticker output port on the liner conveying path; the conveying resistance increasing portion is configured to increase a conveying resistance of the liner paper, causing the liner paper to be in a tensioned state when the sticker is being peeled off.

4. The sticker output box according to claim 3, wherein the conveying resistance increasing portion comprises at least one protruding portion; the at least one protruding portion protrudes towards the liner paper to press against the liner paper, for causing an increase in the conveying resistance of the liner paper.

5. The sticker output box according to claim 4, wherein the conveying resistance increasing portion is a concave-convex undulating surface formed on an outer wall of the box body.

6. The sticker output box according to claim 1, wherein the liner conveying path is upwardly inclined from an upstream of the liner conveying path to the sticker output port, causing the liner paper to be in a tensioned state when the sticker is being peeled off.

7. The sticker output box according to claim 6, wherein the liner paper forms a turn angle greater than 90° at the turning peeling portion.

8. The sticker output box according to claim 1, wherein the box body comprises a base and a lid, and the lid is arranged with a rotation resistance increasing portion configured to increase a rotation resistance of the winding shaft, for preventing the liner paper wound on the winding shaft from coming loose.

9. The sticker output box according to claim 8, wherein the rotation resistance increasing portion is a friction block in frictional contact with a shaft end face of the winding shaft.

10. The sticker output box according to claim 1, wherein the sticker compartment is jointly defined by an inner peripheral wall and an outer peripheral wall, the inner peripheral wall is a circular wall portion, and the outer peripheral wall is a disconnected circular wall portion.

11. A sticker dispending device, wherein a sticker is peelably affixed to a liner paper, and the sticker dispending device comprises:

a main body, arranged with a motor; wherein the motor is configured to output rotation power; and a sticker output box, comprising a winding shaft; wherein the winding shaft is configured to wind the liner paper from which the sticker is peeled off;

wherein the sticker output box is separably combined with the main body, and the winding shaft and the motor are connected through a separable coupling structure;

wherein the winding shaft is configured to be capable of a forward rotation and a reverse rotation driven by the motor; after the winding shaft is forwardly rotated such that the liner paper is tightened and at least one sticker is peeled off, the winding shaft is controlled to reversely rotate at a set angle such that the liner paper is slackened to allow the coupling structure to be easily separated.

12. The sticker dispending device according to claim 11, wherein the coupling structure comprises a shaft portion, and a hole portion that is transmission-fit to the shaft portion;

one of the shaft portion and the hole portion is arranged on the main body, and the other of the shaft portion and the hole portion is arranged on the sticker output box.

13. The sticker dispending device according to claim 12, wherein the main body is arranged with an output shaft transmission-connected to the motor; the shaft portion is formed on the output shaft, and the hole portion is formed on the winding shaft.

14. The sticker dispending device according to claim 12, wherein after the forward rotation of the winding shaft is stopped, the liner paper is tightened to provide a tight fit between the shaft portion and the hole portion; after the reverse rotation of the winding shaft is stopped, the liner paper is slackened to provide a loose fit between the shaft portion and the hole portion.

15. The sticker dispending device according to claim 11, wherein the main body is arranged with a locking mechanism, the locking mechanism being capable of locking the sticker output box to the main body; the main body is further arranged with a button, the button being operable to release the sticker output box from a locked state.

16. The sticker dispending device according to claim 15, wherein the sticker output box is arranged with a locking hole; the locking mechanism comprises a movable snap, the movable snap comprises a push rod, and the push rod is arranged with a hook, the hook is snapped with the locking hole to realize locking of the sticker output box.

17. The sticker dispending device according to claim 16, further comprising a repositioning member being compressed and clamped between the movable snap and a front cover or a rear cover of the main body to maintain the movable snap in the locking position.

18. The sticker dispending device according to claim 17, wherein the rear cover is arranged with a stopper, the stopper is arranged with a first positioning post 191 that extends toward the locking hole; a connection part of the push rod and a connecting arm is arranged with a protruding guide rail on a side of the connection part away from the rear cover, the guide rail extends in a same direction as a sliding direction of the push rod, and an end face of the guide rail towards the stopper is arranged with a second positioning post; the main body defines a guide groove for the guide rail to be accommodated and slid; an end of the repositioning member is sleeved on the first positioning post and an other end of the repositioning member is sleeved on the second positioning post.

19. The sticker dispending device according to claim 11, wherein the sticker dispensing device is configured to be capable of operably outputting the sticker in at least a first mode and a second mode, comprising a body and a control unit; the sticker dispensing device further comprises:

a toggle switch; wherein in response to the sticker output box being attached to the body, the toggle switch produces a mode switching trigger;

wherein the control unit is electrically connected to the toggle switch, and the control unit is configured to control to switch between the first mode and the second mode according to the mode switching trigger from the toggle switch.

20. The sticker dispending device according to claim 19, wherein the sticker output box comprises at least a first box and a second box, the first box being associated to the first mode and the second box being associated to the second mode.

21. The sticker dispending device according to claim 20, wherein the toggle switch is in a turned-on state in response to the first box being attached to the body, and the toggle switch is in a turned-off state in response to the second box being attached to the body.

22. The sticker dispending device according to claim 19, wherein the sticker dispensing device further comprises a timing unit, and a user interface portion for receiving a sticker output instruction from a user; the first mode is configured such that, the control unit determines, based on a preset condition, whether or not to control the sticker output mechanism to output the sticker in response to the sticker output instruction; the second mode is configured such that, the control unit controls the sticker output mechanism to output the sticker in response to the sticker output instruction.

* * * * *